Figure 1:
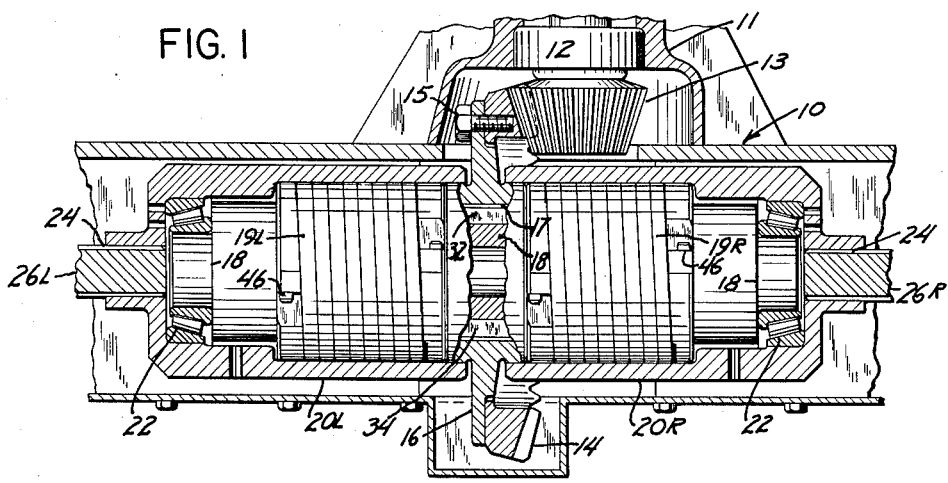

INVENTOR.
CHARLES W. CHILLSON
BY
ATTORNEY

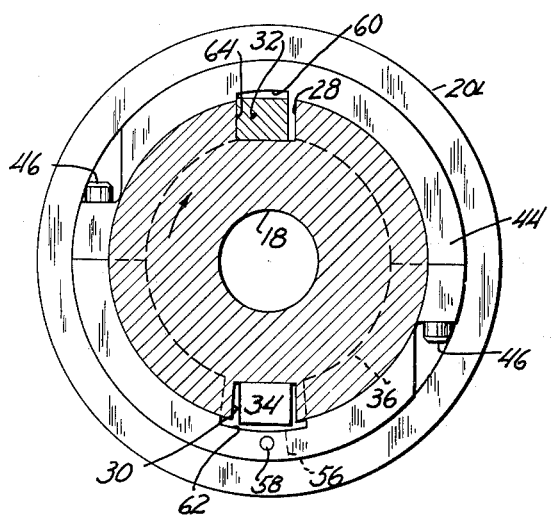
FIG. 4
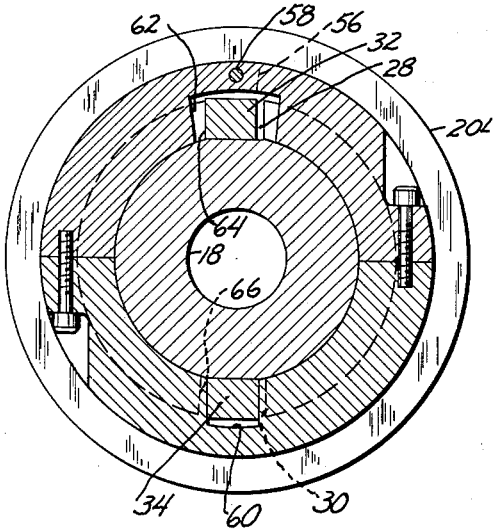
FIG. 5
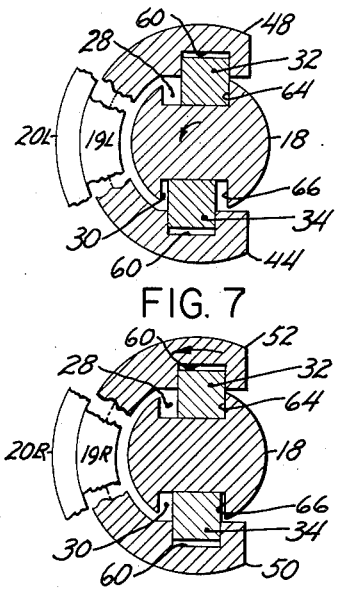
FIG. 6
FIG. 7
FIG. 8
FIG. 9
INVENTOR.
CHARLES W. CHILLSON
BY Godfrey D. Speir
ATTORNEY United States Patent Office 3,040,855
Patented June 26, 1962

3,040,855
AUTOMOTIVE FINAL DRIVE
Charles W. Chillson, Packanack Lake, N.J., assignor to Curtiss-Wright Corporation, a corporation of Delaware
Filed June 30, 1959, Ser. No. 823,928
6 Claims. (Cl. 192—50)

This invention relates to final driving mechanism for automotive vehicles and comprises an improved substitute for the mechanism conventionally known as the differential. In the arrangement of the invention, the conventional propeller shaft drives the conventional ring gear contained within the rear axle housing. The ring gear drives to the right and left wheel axles of the vehicle through spring clutch mechanisms rather than through the conventional gear differential. These spring clutch mechanisms are coordinated to enable either forward or reverse power transmission, and to enable positive drive to both axles when they are capable of rotation at the same speed, or to the slower of the two axles if they are rotating at different speeds. This same mode of drive occurs whether the drive is forward or reverse.

The invention, under normal drive conditions, imposes the drive on the inside wheel when the vehicle is turning, the outside wheel overrunning the inside wheel due to the greater distance the outside wheel must cover. In addition the invention enables the application of torque to both wheels when one of them is on firm roadway and where the other is capable of slippage relative to the ground due to its bearing on ice, snow or mud. As a result of this arrangement, the normal function of the conventional differential is retained when the vehicle is traveling along the road. The added function provides positive drive to one wheel when the other can slip. The invention eliminates a considerable amount of gearing and utilizes components which can be readily fabricated at a cost comparable with or cheaper than conventional differential systems.

An object of the invention is to provide a bidirectional dual drive wherein drive is directed to the slower of two output shafts if they are capable of rotating at different speeds, or if one output shaft tends to overrun the other. A further object is to provide a bidirectional dual drive wherein torque or driving effort is applied to both output elements when the latter are operable at the same speed.

A further object is to provide a bidirectional dual drive mechanism utilizing spring clutch elements in conjunction with driving keys and dogs which enable automatic selection of the optimum drive condition regardless of direction of rotation and regardless of the drive conditions of the two output elements.

Further objects of the invention will become apparent in reading the annexed detailed description in connection with the drawings. In these drawings some of the figures represent a realistic drive mechanism while others of the figures are distorted to enable a clear understanding of the mode of operation of the invention under different driving conditions. The embodiment selected for illustration and detailed description is only one of a number of practical arrangements of the invention, and it will be clear that modifications can be made within the scope of the invention.

Figure 2:
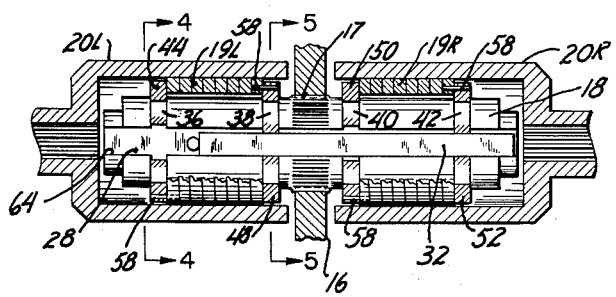
Figure 3:
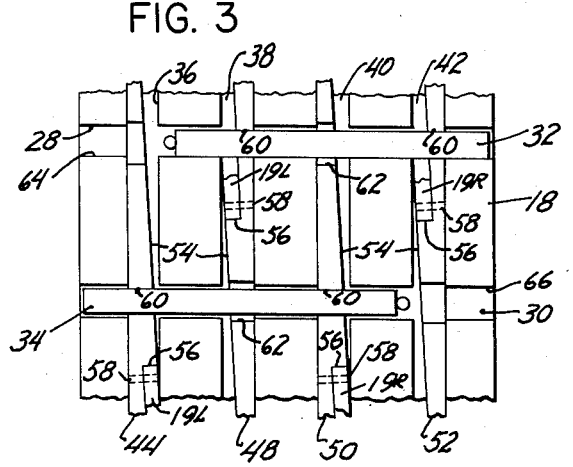

In the drawings, FIG. 1 is a plan section of an exemplary form of automotive final drive, FIG. 2 is a fragmentary section akin to FIG. 1, showing operational elements of the invention and omitting certain of the elements of FIG. 1 which are unnecessary for an understanding of the invention, FIG. 3 is a developed or unrolled diagram of significant elements of FIG. 2, FIG. 4 is a section on the line 4—4 of FIG. 2, FIG. 5 is a section on the line 5—5 of FIG. 2, FIGS. 6 and 7 are diagrams, somewhat distorted, of the right and left assemblies of the mechanism of FIG. 2 showing drive and overrun positions of the elements for counterclockwise rotation and FIGS. 8 and 9 are diagrams, somewhat distorted, of the right and left assemblies of the mechanism of FIG. 2 showing drive and overrun positions of the elements for clockwise rotation.

Referring first to FIG. 1, I show a housing assembly 10 analogous to an automotive rear axle. A forward projection 11 of the housing contains a bearing 12 supporting the usual drive pinion 13. The laterally extending housing 10 contains a bevel gear 14 meshed with and driven by the pinion 13, the gear 14 being secured as at 15 to an annular member 16, splined at 17 to a stub shaft 18 extending laterally within the housing. This shaft is loosely embraced by left and right clutch springs 19L and 19R respectively and at times these clutch springs are driven by the shaft 18 into expanding sleeves 20L and 20R which embrace them. The free diameter of springs 19L and 19R is slightly greater than the inside diameter of the sleeves, so the springs have a snug friction fit in the sleeves. Shaft 18 is piloted at its ends through bearings 22 in the ends of sleeves 20L and 20R, these sleeves also being piloted by antifriction bearings, not shown, in the housing 10. The ends of the sleeves 20L and 20R are provided with internal splines 24 engaged respectively by the ends of driven shafts 26L and 26R which, in an automotive final drive, would constitute the driving axles connected to wheels or the like, not shown. The foregoing depicts the general environment for my drive system, and subsequent figures, utilizing the same reference characters where appropriate, will explain the additional mechanism necessary and the functioning of the whole arrangement.

Referring now to FIGS. 2–5 the components already described will be noted therein. The stub shaft 18 is provided with two longitudinal keyways 28 and 30, preferably disposed 180° apart on the shaft and extending the entire length of the shaft, through and beneath the splined connection 17 carrying the annular member 16 which drives the shaft. In the keyway 28, a key 32 is loosely fitted and similarly a loosely fitted key 34 is disposed in the keyway 30. Additionally, the shaft 18 is provided with four annularly spaced-apart grooves 36, 38, 40 and 42. A split ring 44 is assembled in the groove 36, the split arrangement being shown in FIG. 4 wherein the two ring halves are secured to one another as by screws 46. In similar fashion a split ring 48 is assembled in the groove 38, a split ring 50 is assembled in the groove 40 and a split ring 52 is assembled in the groove 42. All of these rings, as shown in FIG. 3, are formed with one helical face 54 and a shoulder or abutment 56. The helical faces of rings 44 and 48 face one another and between them, the spring 19L is disposed, the ends of the spring butting against the shoulders 56 and the face of the end turn of each spring making substantial contact with the helical faces 54 of the rings. Further, the spring ends are pinned to the rings close to the shoulders 56 by pins 58 whereby the rings 44 and 48 are constrained to move with the spring ends and vice versa. In similar fashion the rings 50 and 52 have their helical faces 54 facing one another and between the faces 54, the spring 19R is disposed, the ends of the spring 19R being pinned to the rings at 58 in the same fashion as described. Each ring is provided with a cut-out 60 embracing one of the keys in snug relationship. This is shown in FIG. 4 where the cut-out 60 embraces or bridges the key 32. Each ring is further provided with a cut-out 62 which has ample clearance relationship with the other key 34 as shown in FIG. 4. The arrangements of cut-outs 60 and 62 relative to the keys vary according to the ring relationship to the keys and springs as will now be pointed out. Referring to FIG. 3, key 32 snugly engages ring 52 and ring 48, key 32 likewise having clearance relationship to rings 50 and 44. Conversely, rings 44 and 50 have snug relationship with key 34 while rings 48 and 52 have clearance relationship to key 34.

Now, the functioning of the rings and keys and springs will be pointed out in reference to FIG. 3. Let us assume that the unrolled shaft 18, as the driving member, moves upwardly. Thereby, the key 32 will bear on the bottom of the keyway 28 and the key will drive rings 48 and 52 upwardly. Since the right hand end of spring 19L is secured to ring 48 and since the right hand end of spring 19R is secured to ring 52, said two spring ends will move upwardly and will be expanded into driving engagement with the respective sleeves 20L and 20R. Since the springs have initial frictional engagement with the sleeves, the left ends of the springs, with their rings 44 and 50, are unrestrained circumferentially, even though they snugly engage the key 34, for the key 34 is now loose in its keyway 30. Accordingly, driving effort is applied to both sleeves 20L and 20R.

Should sleeve 20L be driven externally to overrun sleeve 20R, the latter will continue to be driven, and through drive reaction torque imposed by ring 52, key 32 is held firmly in engagement with the driving face 64 of the keyway 28. Thus, the ring 48 is held in the same position relative to the keyway as ring 52, but due to overrun of sleeve 20L, clutch spring 19L wraps inwardly, allowing the necessary slip between it and the sleeve 20L. In this inward wrapping, the left end of spring 19L and its ring 44 moves slightly and freely in angular relation to the right end of the spring, which movement is tolerated by the wide clearance 62 in ring 44 and by the loose fit of the other key 34 in its slot 30.

Should sleeve 20R overrun sleeve 20L, the action is as described except that the ring 48 holds key 32 in driving position against keyway face 64 allowing ring 50 to move upon windup of spring 20R, held at its right end by ring 52.

For reverse driving action, the driving member 18 moves downwardly in FIG. 3, key 34 becomes the driving key and key 32 becomes loose in its keyway 30. The driving face of keyway 30 is at 66. Rings 44 and 50, snugly engaged with key 34, drive the left ends of springs 19L and 19R downwardly, effecting drive to the respective sleeves 20L and 20R because of the snug fit of the springs in the sleeves and the wrapping action thereof against the sleeves.

Either sleeve may overrun the other but the sleeve still driving holds key 34 against the keyway face 66. When either sleeve wants to overrun, its corresponding spring winds toward the shaft 18 and allows the overrun. Since the key 32 is now loose in its keyway, the releasing spring movement is allowed.

FIGS. 6–9 show schematically the relationship of the parts under different operational conditions, particularly pointing out the character of dimensions and clearance which must be designed into the keys, keyways and springs to provide a properly functioning assembly.

FIG. 6 represents the shaft 18 driving counterclockwise and driving the ring 48 and the right end of spring 19L through key 32. The spring expands into the sleeve 20L, and the spring is cut to such length that the left ring 44 holds the key 34 substantially midway of the width of keyway 30.

FIG. 7 shows the condition of spring 19R and related parts, under the condition when shaft 18 is driving spring 19L counterclockwise as in FIG. 6, and when sleeve 20R is overrunning the shaft in a counterclockwise direction. Here, key 32 is held in the rightward position against keyway face 64 due to the drive as in FIG. 6. However, due to overrun of the sleeve 20R, the spring 19R is wound inward slightly, moving the ring 50 and key 34 to the right in the keyway 30. Still, due to proper dimensional control of spring length the key 34 is loose in the keyway 30. If this looseness is not allowed, the system can bind and prevent sleeve overrun.

FIG. 8 represents the shaft 18 driving clockwise and driving the ring 44 and the left end of spring 19L through the key 34. The spring expands into the sleeve 20L, the spring being cut to such length that the right ring 48 holds the key 32 substantially midway of the width of the keyway 28.

FIG. 9 shows the condition of spring 19R and related parts under the condition when shaft 18 is driving spring 19L clockwise as in FIG. 8, and when sleeve 20R is overrunning the shaft in a clockwise direction. Here, key 34 is held in the rightward position against keyway face 66 due to the drive as in FIG. 8. However, due to overrun of the sleeve 20R, the spring 19R is wound inward slightly, moving the ring 52 and key 32 to the right in the keyway 28. Still, due to proper dimensional control of spring length, the key 32 is loose in the keyway 28. If this looseness is not allowed, the system can bind and prevent sleeve overrun.

In FIGS. 6–9, spring 19L is shown as driving, and spring 19R being overrun. Should spring 19R be driving with spring 19L being overrun, the effects are like those described, with appropriate substitution of some parts for others.

If both springs 19R and 20R are driving, the configuration would be as in FIG. 6 for counterclockwise drive and as in FIG. 8 for clockwise drive. There is no "neutral" or non-driving condition. One or both of the sleeves 20L and 20R will always be driven for both drive directions of shaft 18. In transition between forward and reverse drive, there is a minor amount of backlash, amounting to only a few degrees of angular travel of shaft 18, as the keys 32 and 34 adjust themselves automatically for their driving or non-driving function.

Since there is a requirement for freedom of the non-driving end of each spring member under any driving condition, care must be exercised in the design of a specific embodiment of the invention to assure this freedom in conjunction with reasonable wear allowances and manufacturing tolerances of the several parts of the device. In general, a greater amount of backlash results from the use of generous wear allowances and tolerances.

Modifications of the invention, not shown, but within the scope of the invention, include substitution of hook ends on springs engaging the keys, in lieu of the shouldered rings 44, 48, 50 and 52. External contracting clutch springs may be utilized in lieu of internal expanding clutch springs, which require an inversion of the driving and driven components. Each clutch spring provides an effective and rugged one-way drive of high torque capacity due to its self-energizing action. Through the key and keyway arrangements of the invention, the proper spring energization is selected automatically to achieve the desired driving and overrunning characteristics.

In the foregoing description, it was pointed out that the invention provides drive in either direction, always at least one wheel, or normally driven member, coupled to the normal drive or input member. This holds true also if the driven members become drivers, as in the case of a coasting vehicle when the wheels drive the engine. In other words, at least one spring clutch will be in driving engagement regardless of the direction of rotation and regardless of the direction of torque application.

It will be clear to those skilled in the art that various changes and modifications may be made in the structure shown and described without departing from the spirit and scope of the invention as set out in thte appended claims.

I claim:

1. A drive system comprising a central rotating normally driving member, said member having two longitudinal slots and a key loosely engaged in each slot, a pair of helical clutch springs each loosely embracing a portion of said member, means drivably connecting one end of each of said springs with one of said keys, means drivably connecting the other end of each of said springs with the other of said keys, and a normally driven sleeve embracing and engaging each of said springs, the free diameter of said springs being slightly greater than the internal diameter of said sleeves.

2. A drive system according to claim 1 wherein the looseness of said keys in said slots is such that, when either key drives one of said springs and its sleeve, the other key is loose in its slot.

3. A drive system comprising a central rotating normally driving annulus having a shaft extending from each end thereof, a pair of slots each of which extends longitudinally along both of said shafts, a key loosely fitted in each slot for circumferential movement relative to the shafts, a helical clutch spring loosely embracing each said shaft, a driving connection from one key to one end of each spring, a driving connection from the other key to the other end of each spring, and a pair of normally driven sleeves respectively embracing and frictionally engaging one and the other of said springs.

4. A drive system comprising two normally driven coaxially spaced shafts, a normally driving member disposed between the ends of said driven shafts, said member having a pair of key slots therein, a key loosely fitted in each slot for circumferential movement relative to the member, a spring clutch loosely embracing each end of said member, means securing one end of each spring clutch to one of said keys, means securing the other end of each spring clutch to the other of said keys, a pair of sleeves respectively embracing one and the other of the spring clutches, each sleeve having an internal diameter such that its spring clutch expands into driving engagement therewith upon rotation of said driving member, and a driving connection from each said sleeve to its adjacent driven shaft.

5. In a vehicle final drive including an axle housing having separate coaxially spaced axle shafts extending therethrough, a ring gear coaxial therewith and means to drive the ring gear, a two-slotted shaft normally driven by the ring gear and lying between and coaxial with the axle shafts, a sleeve on the inner end of each axle shaft embracing an end of said slotted shaft, a spring clutch embracing each end of said slotted shaft, a key loosely fitted in each slot of the slotted shaft, means to effect a driving connection between one key and one end of each said spring clutch, and means to effect driving engagement of the other key with the other end of each spring clutch.

6. A drive system comprising a pair of axially spaced rotatable members; a rotatable member concentric with said pair of axially spaced members having two longitudinal slots and a key loosely engaged in each slot; a pair of helical springs, one of which is located between one axially spaced member and said slotted rotatable member and the other of which is located between the other axially spaced member and the slotted rotatable member, said axially spaced rotatable members being frictionally engaged by the respective springs; means drivably connecting one end of each of said springs with one of said keys; means drivably connecting the other end of each of said springs with the other of said keys; and means for driving the slotted member.

References Cited in the file of this patent

UNITED STATES PATENTS

| | | |
|---|---|---|
| 1,910,319 | Brownlee | May 23, 1933 |
| 2,235,266 | Starkey | Mar. 18, 1941 |
| 2,242,379 | Wahl | May 20, 1941 |
| 2,855,615 | Sacchini et al. | Oct. 14, 1958 |
| 2,888,114 | Bostock | May 26, 1959 |

FOREIGN PATENTS

| | | |
|---|---|---|
| 706,287 | France | Mar. 24, 1931 |